Figure 8:
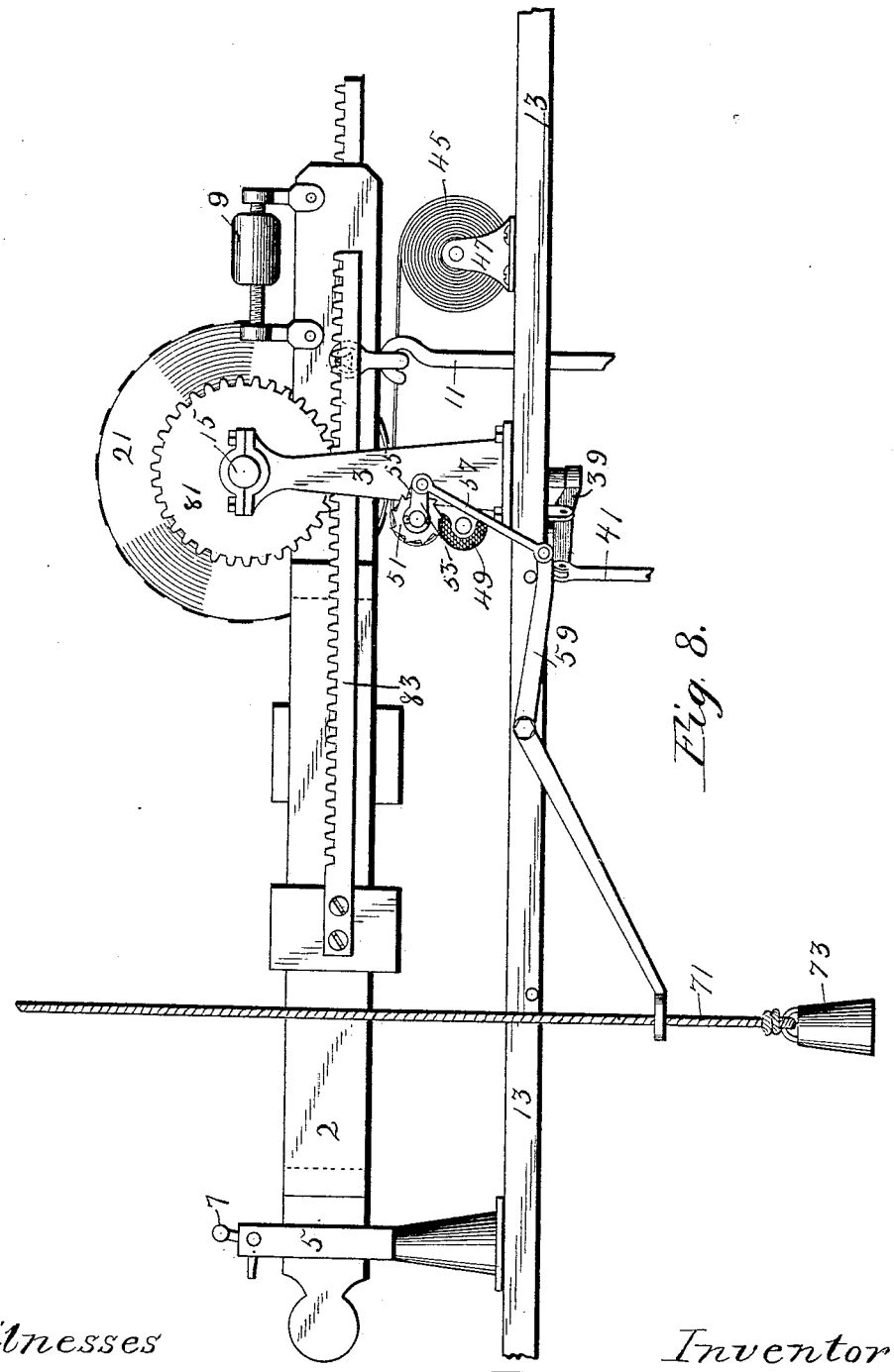

(No Model.) 4 Sheets—Sheet 1.
R. McFARLANE.
RECORDING WEIGHING SCALE.
No. 495,751. Patented Apr. 18, 1893.
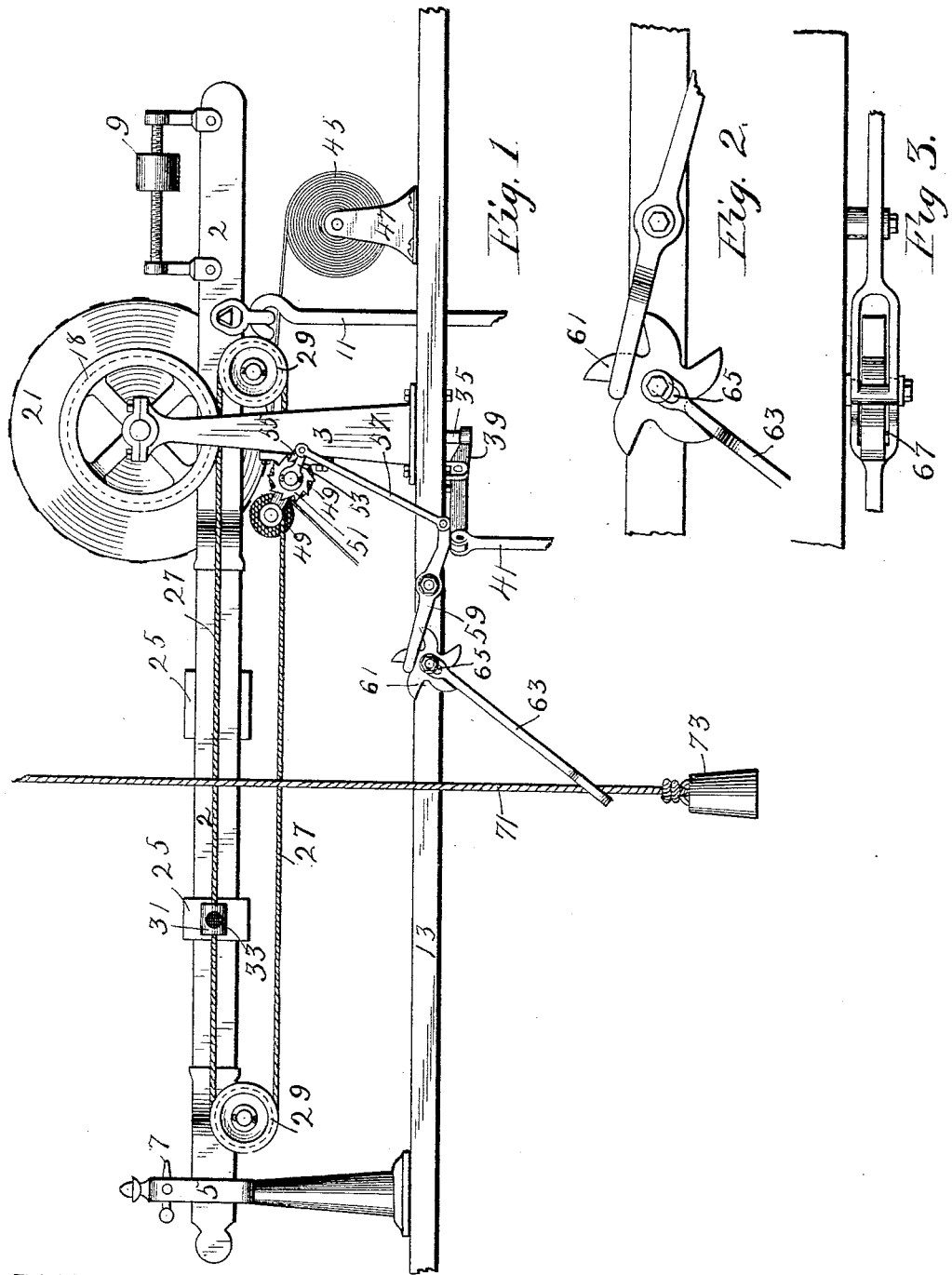
Witnesses
G. E. Purple
C. E. Van Dorn
Inventor
Robert McFarlane
By Paul Merwin
His Atty's (No Model.) 4 Sheets—Sheet 2.
R. McFARLANE.
RECORDING WEIGHING SCALE.
No. 495,751. Patented Apr. 18, 1893.
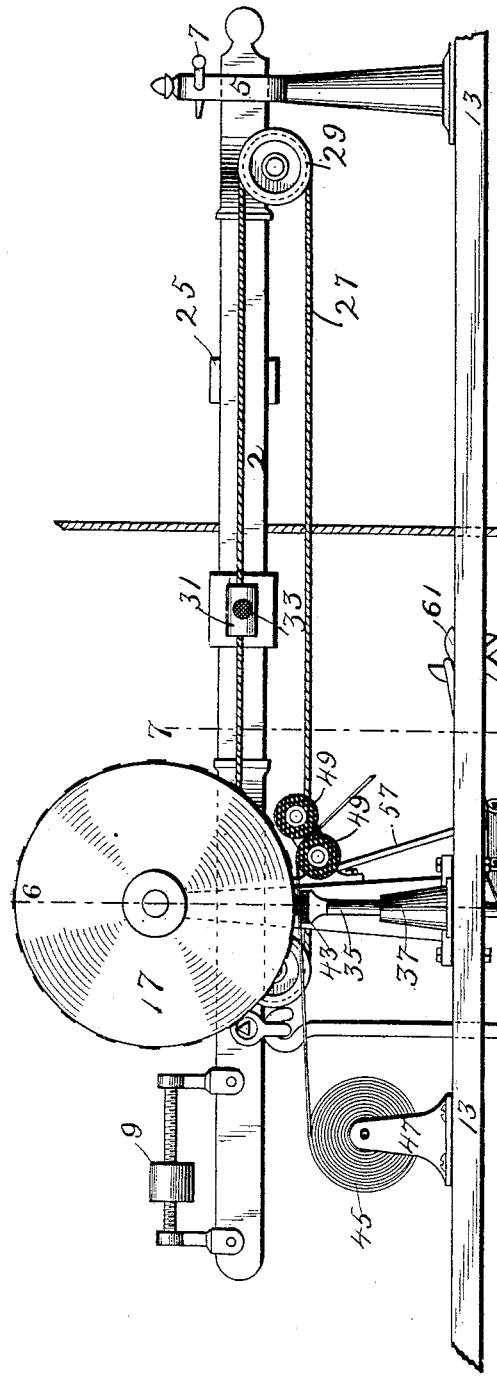
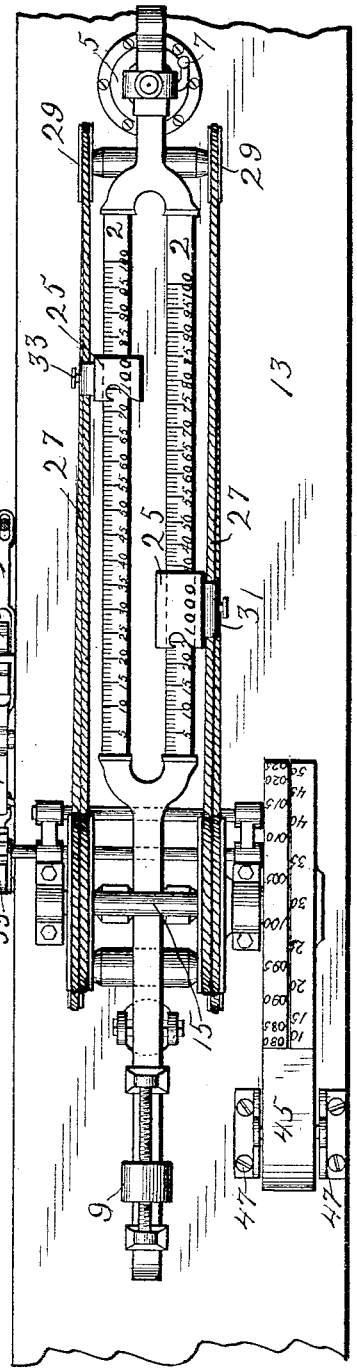
Witnesses
G. E. Purple
C. E. Van Doren
Inventor
Robert McFarlane
By Paul & Merwin His Attys.

(No Model.) 4 Sheets—Sheet 3.
R. McFARLANE.
RECORDING WEIGHING SCALE.
No. 495,751. Patented Apr. 18, 1893.
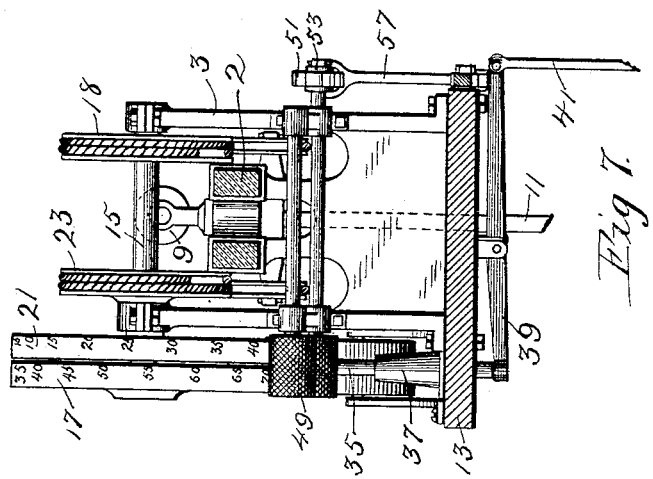
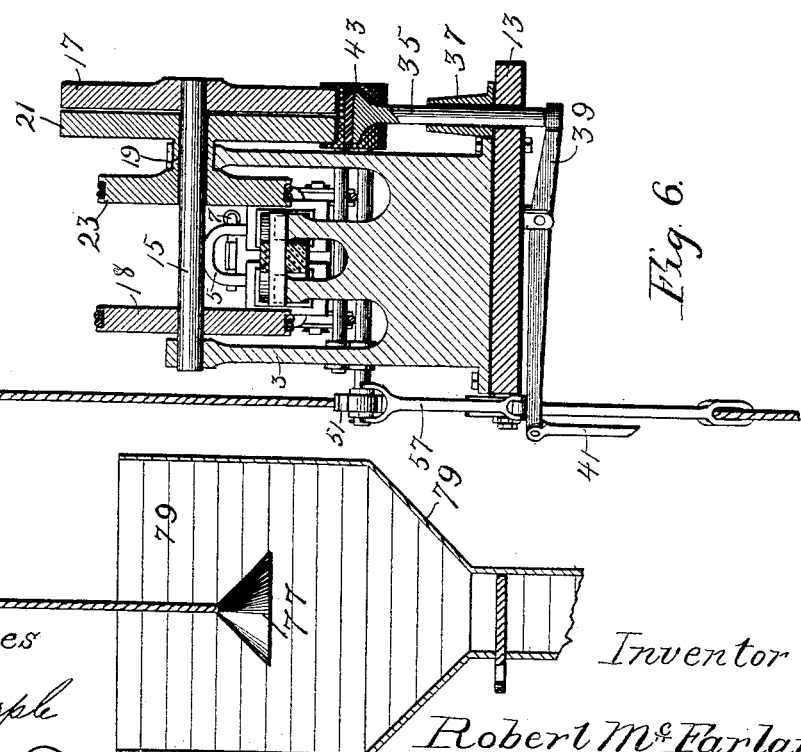

(No Model.) 4 Sheets—Sheet 4.

R. McFARLANE.
RECORDING WEIGHING SCALE.

No. 495,751. Patented Apr. 18, 1893.

Witnesses
J. E. Purple
C. E. Van Doren

Inventor
Robert McFarlane
By Paul & Merwin His Atty's

UNITED STATES PATENT OFFICE.

ROBERT McFARLANE, OF MINNEAPOLIS, MINNESOTA, ASSIGNOR OF ONE-HALF TO WALDO E. HOLMES, OF SAME PLACE.

RECORDING WEIGHING-SCALE.

SPECIFICATION forming part of Letters Patent No. 495,751, dated April 18, 1893.

Application filed August 9, 1892. Serial No. 442,605. (No model.)

*To all whom it may concern:*

Be it known that I, ROBERT MCFARLANE, of Minneapolis, in the county of Hennepin, State of Minnesota, have invented certain Improvements in Recording-Scales, of which the following is a specification.

The object of this invention is to provide a weighing scale with a recording mechanism by means of which a permanent record of the amount of each weighing may be made.

Another object is to provide a mechanism of this kind that will make each record upon a suitable recording strip or tape, and at the same time permit other records to be made upon independent tickets or strips.

Another object is to provide a mechanism of this kind arranged to be used in connection with a grain hopper, so as to be automatically operated by the movement of the grain as it passes from the hopper.

Other objects of the invention will appear from the following detailed description, taken in connection with the accompanying drawings, in which—

Figure 1 is a side elevation of my improved mechanism showing the connection with the cord that runs to the grain bin and automatically operates the recording mechanism. Figs. 2 and 3 are details of a portion of the operating mechanism. Fig. 4 is a side view looking in the opposite direction from Fig. 1. Fig. 5 is a plan view. Figs. 6 and 7 are transverse sections taken upon lines 6—6 and 7—7 of Fig. 4. Fig. 8 is a side elevation showing substantially the same mechanism as Fig. 1, but with a rack bar substituted for the cable shown in that figure for operating the recording scale beam.

In the drawings 2 represents the scale beam that is pivotally supported upon suitable standards 3, and preferably has its opposite end passing through the guide standard 5 and provided with the usual lock 7. This scale beam is preferably provided with the counterpoise 9, adjustably supported thereon and is connected to the scale platform which may be of any suitable construction, by the rod 11, in any ordinary or preferred manner. The standards 3 and 5 are preferably supported upon the suitable base plate 13. Mounted in the standard 3, directly over the pivotal point of the beam is a suitable shaft 15. This shaft carries the recording wheel 17 and also the pulley 18. Mounted upon this shaft in one of the side standards is the sleeve 19, which is arranged to turn freely upon said shaft. This sleeve is provided with the recording wheel 21 and with the pulley 23. The beam that I have here shown is a double beam, provided with the two series of graduations as shown most clearly in Fig. 5, and each part of the beam is provided with the sliding poise 25. A cord or cable 27 is connected to each of the poises 25, passes round the pulley 18 or 23 and around the idler wheel or pulley 29 at the opposite end of the beam— said idler pulleys being mounted in suitable bearings and supported upon said beam. The poises upon the beams are preferably of different sizes and they are used for weighing different amounts in a well understood manner.

As here shown I have marked one of the said poises 100 and the other 1,000. They may, of course, be of any suitable size and may be used in connection with the graduation of the scale upon the beam for weighing any desired amounts. The cable 27 in connection with each of said poises, preferably passes through a sleeve 31, said sleeve being provided with a suitable set screw 33, so that when it is desired to use said sliding poise without operating the recording device, the said screw may be loosened so as to free the cable from the sleeve 31 and then the sliding poise may be moved over the beam without turning said recording wheel. The wheels 17 and 21 are preferably provided each with a series of raised figures said figures being arranged to correspond with the figures upon the beam—the figures upon one wheel preferably indicating units and tens, while those upon the other wheel indicate hundreds and thousands. Arranged beneath said recording wheels is a sliding standard 35, said standard being arranged to pass through the vertical guide 37, and having its lower end connected to the lever 39, that is in turn is connected to the suitable treadle by the rod 41. The upper end of the standard 35 is preferably provided with a rubber surface 43 and the roll of paper 45, preferably mounted in suitable standards 47. The strip of paper from said roll passes over the cushioned end of the standard 35 and the surface of the recording wheels. Said strip then passes between the feed rolls 49. The standard 35 may be operated through the means of the treadle referred to whenever it is desired to make an impression upon the recording strip, and this will be after each load or amount of material has been weighed upon the scale. I also provide means for operating the feed rolls for the purpose of feeding forward the recording strip. The device that I prefer for this purpose is shown in Fig. 1. As here shown one of said rolls is provided with the ratchet wheel 51 and with a lever 53, pivoted upon the axis of said roll and provided with a pawl 55 adapted to engage said ratchet wheel. The lever 53 is connected by a rod 57 to the lever 59, and said lever is provided with the slotted end that engages the star wheel 61, so that as said wheel is rotated the end of the lever rides by over the curved surface of the teeth upon said wheel and then drops over said teeth and remains in this position till the next movement of the wheel. The wheel may be operated in any suitable manner.

As here shown, I use a lever 63 provided upon the axis of the wheel 61 by means of a slot 65, and having a forked end 67, said fork being adapted to pass over the teeth on the wheel 61, when the lever is drawn down the full length of the slot 65, as shown in Fig. 2, said fork engaging the straight side of the teeth on the wheel 61 when the lever 63 is raised so as to bring the lower end of the slot 65 opposite the center of the wheel 61. Where it is desired to have the device operate automatically, I pass a cord 71, through the end of the lever 63 and provide a weight 73 thereon. This cord runs over suitable pulleys, as indicated in Fig. 6 and has upon its end the cone shaped plate 77. This plate is arranged within the hopper 79 so that as the grain is drawn out from the hopper the suction of the grain passing into the hopper spout draws down the plate 77, thereby raising the opposite end of the cord raising the lever 63 and causing it to engage one of the teeth 61. A further movement of the cord 71 turns the wheel 61 and the movement of said wheel turns the lever 59, thereby causing its pawl 55 to pass over the teeth of the ratchet wheel. The lever 59 is preferably arranged so that its end comes directly over the lever 39 that operates the movable standard 35, so that the movement of the lever 59 will operate the lever 39, cause the standard 35 to be raised and make an impression on the paper corresponding to the last movement of the slides upon the beam. The return movement of the lever 39, which will be caused by gravity or by a suitable spring connected with the treadle or the treadle rod 41, will turn the lever 59 and through the rod 57 and pawl 55 will turn the ratchet wheel of the feed roll, and thereby feed forward the paper preparatory to making the next record.

Instead of using the cables for operating the recording wheels, I may provide said wheels with the gears 81 and provide the poises with the rack bars 83, engaging said gears as shown in Fig. 8, and instead of using the star wheel and the levers 59 and 63 as shown in Fig. 1, I may connect the lever 59 directly with the cord 71 as shown in Fig. 8.

I claim as my invention—

1. The combination with the beam and the sliding poise arranged thereon, of the recording wheel mounted upon a support independent of said beam, the axis of said wheel being parallel to the axis upon which said beam turns, means connecting said sliding poise with said wheel whereby the wheel is turned as the poise is moved over the beam, and means for pressing a suitable recording strip against said wheel.

2. The combination with the beam and the sliding poise arranged thereon, of the recording wheel provided with characters or figures corresponding with the characters or figures upon said beam, said wheel being mounted upon a support independent of said beam with its axis parallel with the axis of the pivot upon which said beam turns, means connecting the sliding poise with said wheel whereby said wheel is turned as the poise is moved over the beam, a recording strip, means for feeding said strip past said wheel, and means for pressing said strip against said wheel, for the purpose specified.

3. The combination with the double beam, each part being provided with a sliding poise, of the corresponding recording wheels mounted upon a support independent of said beam, means connecting said wheels with said poises whereby each wheel is moved independently with its poise, a recording strip, means for feeding said strip past said wheels and means for pressing said strip against said wheels, for the purpose specified.

4. The combination with the double scale beam provided with the sliding poises, the recording wheels, independent supports for said wheels, the cords or cable 27 connecting said poises with said wheels, the recording strip, the feed rolls for moving said strip past said wheels, and a movable standard for pressing said strip against said wheels, substantially as described.

5. The combination with the beam, of the recording wheel mounted upon an independent support with its axis parallel with the pivotal axis of said beam, the pulley connected with the axis of said wheel, the idler 29 arranged at the opposite end of said beam and supported thereon, the cable or cord 27 passing around said pulley and around said idler, and the sliding poise connected with said cable.

6. The combination with the beam and sliding poise, a recording wheel connected with said poise, the recording strip, the feed rolls, the grain hopper, the plate arranged in said hopper, a movable standard for pressing said strip against said wheel, and means connecting the plate in the hopper with said feed rolls and standard whereby the movement of the grain in the hopper operates said standard and feed rolls.

7. The combination with the recording wheels, the beam and the sliding poise, of the recording strip, the feed rolls, the movable standard for pressing said strip against said wheel, the grain hopper, and means arranged in said hopper for operating said movable standard.

8. The combination with the recording wheels, the feed rolls and the recording strip, of the movable standard for pressing said strip against said wheels, the lever 59 connected with said rolls, the lever 39 connected with the movable standard and adapted to be moved by the lever 59, and means for operating said levers.

9. The combination with the recording wheels, the recording strip and the feed rolls, of the lever 59 for operating said rolls, a cord 71 connected to said lever, the grain hopper and the plate 77 arranged in said hopper and connected with said cord, substantially as described.

In testimony whereof I have hereunto set my hand this 4th day of August, 1892.

ROBERT McFARLANE.

In presence of—
 A. C. PAUL,
 M. E. GOOLEY.